Dec. 14, 1954   A. J. HUSING   2,696,828
UNLOADER VALVE WITH MEANS FOR PREVENTING PRESSURE SURGES
Filed June 11, 1952   2 Sheets-Sheet 1

INVENTOR.
ALBERT J. HUSING
BY- Clark, Ott
ATTORNEYS

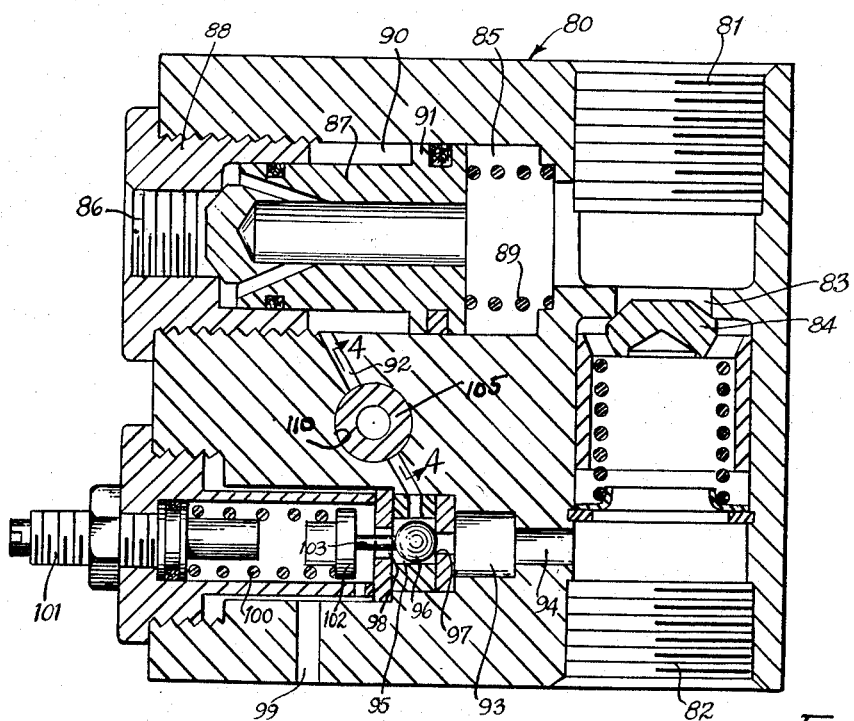
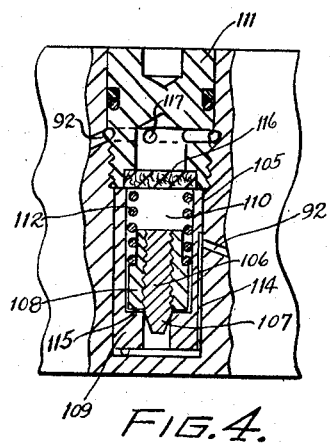
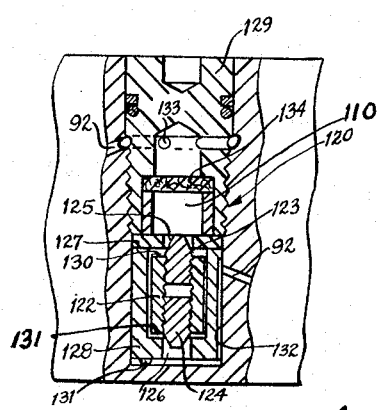

United States Patent Office 2,696,828
Patented Dec. 14, 1954

2,696,828

UNLOADER VALVE WITH MEANS FOR PREVENTING PRESSURE SURGES

Albert J. Husing, Dumont, N. J., assignor to Air Associates, Incorporated, Teterboro, N. J., a corporation of New Jersey Application June 11, 1952, Serial No. 292,916

5 Claims. (Cl. 137—108)

This invention relates to unloader valves adapted for use in a closed hydraulic system for actuating operational parts of apparatus.

The invention has in view an unloader valve which functions to close the outlet port to the system when the pressure therein has reached a predetermined limit and which by-passes the overload from the pressure creating means to a reservoir located in said system and connected with the suction side of the pressure creating means.

The invention has for a further object the provision of an unloader valve of said character adapted for operation between extreme pressure limits and which is constructed so as to provide a differential of pressure between "cutting in" and "cutting out" of the overload valve element and with means for slowing down operation of the valve so as to prevent pressure surges in the system.

Still another object of the invention is to provide a fluid restrictor interposed in a by-pass duct between the outlet side of the valve and the passageway leading to the reservoir at the rear of the valve element controlling the discharge thereto which restrictor is adjustable for restricting the flow of the fluid in either or both directions through said duct to thereby slow up the movement of the valve element in either or both directions for preventing pressure surges in the system.

Another object of the invention is the provision of a fluid restrictor of said character which prevents the accumulation in said duct of minute particles of foreign matter which may be present in the fluid.

Still another object of the invention is to provide an unloader valve with a fluid restrictor of said character which is adjustable to vary the size of the flow passageway formed as a part of said duct for regulating the quantity of flow therethrough.

With the following and other objects in view, reference is now made to the following specification and accompanying drawings in which the preferred embodiments of the invention are illustrated.

In the drawings:

Fig. 3 is a longitudinal sectional view of a modified form of unloader valve constructed in accordance with the invention.

Fig. 4 is an enlarged fragmentary transverse sectional view taken approximately on line 4—4 of Fig. 3.

Fig. 5 is a view similar to Figs. 2 and 4 showing a modified form of resistor adapted to be used with the valves shown in Figs. 1 and 3.

Figure 1:
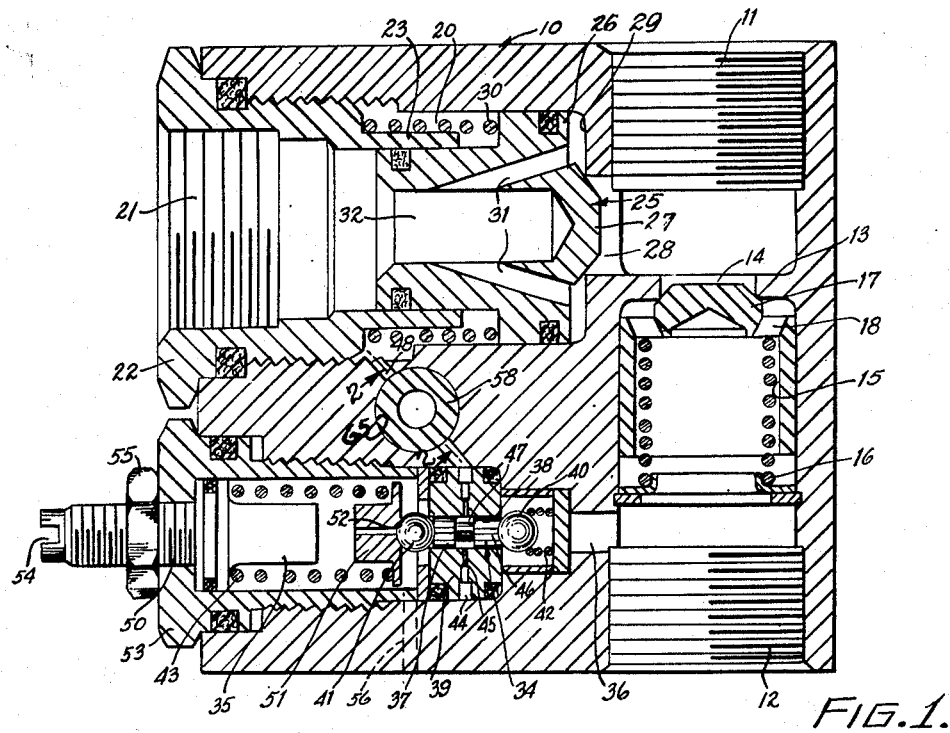
Fig. 1 is a longitudinal sectional view through an unloader valve constructed in accordance with the invention.
Figure 2:
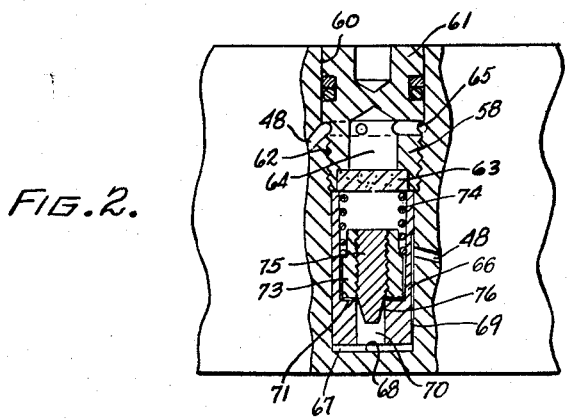
Fig. 2 is an enlarged fragmentary transverse sectional view taken approximately on line 2—2 of Fig. 1.

Referring to the drawings by characters of reference, the unloader valve includes a valve body 10 of any desired configuration and which as illustrated is of rectangular formation in longitudinal and transverse cross-section and is provided with an inlet chamber 11 and an outlet chamber 12 which are disposed in alignment and in communication with each other through an apertured partition 13 defining a valve port 14. The inlet chamber 11 is adapted to be connected by piping with a pump (not shown) for pumping fluid through the system and the outlet chamber 12 is connected by piping (not shown) with the operational parts to be operated by the fluid pressure in the system.

The valve port 14 is controlled by a valve element 15 mounted for reciprocatory movement in the outlet chamber 12 and which is tensioned by a coiled expansion spring 16 for maintaining the valve element 15 in engagement with the partition wall 13 for closing the valve port 14. The valve element 15 is provided with a conical shaped inner end 17 and with circumferentially spaced longitudinally extending openings 18 in the periphery thereof through which the fluid passes when the valve element is in open relation.

The valve body 10 is formed with a bore or chamber 20 which communicates with the inlet chamber 11 at its inner end and is provided with an overload discharge outlet 21 opening through the side wall of the body in which an adapter 22 is threadedly secured and formed with an inwardly extending reduced annular skirt 23. The adapter 22 is connected by piping (not shown) for discharge to the reservoir of the system. The flow of fluid through the overload discharge outlet 21 is controlled by the movement of a reciprocatory valve element 25 having a flanged inner end 26 which slidably fits the cylindrical chamber 20 and with the outer end of the valve element slidably fitting the reduced annular skirt 23. The said valve element is formed with a forwardly projecting reduced inner end 27 which is adapted to seat against the partition wall 29 defining an overload port 28 and which is normally retained in closed relation therewith by means of a coiled expansion spring 30 interposed between the flange 26 of said valve element and the inner end of the adapter 22. The overload fluid discharged through the port 28 passes through openings 31 in the valve element which open through the forward end thereof in circumferentially spaced relation about the reduced inner end 27 and which communicate at their outer ends with an enlarged central bore 32 in the valve element.

When the pressure of the fluid in the outlet chamber 12 exceeds a predetermined limit, provision is made for reducing the pressure on the outlet side of the valve element 25 whereby the pressure in the inlet chamber 11 will function to move the valve element 25 into open relation to thereby by-pass fluid from the inlet chamber through the valve element 25 and thence through the discharge outlet 21 for discharge thereof to the reservoir thereby reducing the pressure against the valve element 15 whereby the same is moved into closed relation by the expansion spring 16 and the differential of pressure on the opposite sides thereof. The valve element 15 is retained in closed relation until the pressure in the outlet chamber 12 drops below the predetermined limit when the valve element 25 will be moved to closed relation to shut off the overload discharge and the valve element 15 will then be moved to open relation to permit of the flow of the fluid from the inlet chamber 11 through the valve port 14 and thence through the outlet chamber 12.

This is accomplished by means of a reciprocatory valve means 34 mounted at the inner end of an annular chamber 35 arranged in parallel relation with the chamber 20 and which opens through the valve body and is in communication with the outlet chamber 12 through a reduced passageway 36. The valve means 34 includes a reciprocatory valve element 37 mounted for reciprocatory movement in the bore 38 of a sleeve 39, the ends of the sleeve 39 providing seats for ball valve elements 40 and 41 which are maintained in engagement with the ends of the reciprocatory valve element 37 by means of coil springs 42 and 43. The sleeve 39 is formed with an annular recess 44 in the periphery thereof and with a plurality of small openings 45 extending through the wall of the sleeve and opening into the interior thereof. The valve element 37 is formed with longitudinally extending grooves 46 which open at their inner ends into an annular recess 47 which is in communication at all times with the openings 45. A duct 48 extends angularly through the valve body from the chamber 35 to the chamber 20 at the rear of the valve element 25 so as to establish communication from the outlet chamber 12 to the annular space in the chamber 20 between the flange 26 and the reduced inner end of the adapter 22 whereby the pressure of the liquid in the outlet chamber 12 will be exerted against the outer face of the inner flange 26 to thereby augment the pressure of the spring 30 to move and maintain the valve element 25 in closed relation.

The ball valve element 41 is tensioned against the valve element 37 by means of the coiled expansion spring 43 interposed between the enlarged inner end of an adjusting screw 50 and a flanged element 51 protruding axially through the inner end of the spring 43 and having a concave inner face 52 bearing against the ball valve element 41 and which retains the ball valve element between the same and the valve element 37. The adjusting screw 50 is threadedly engaged in the outer end of a screw cap 53 for varying the tension of the spring 43 so as to establish the desired predetermined limit of the pressure in the outlet chamber 12 at which the ball valve element 40 is moved to closed relation and the ball valve element 41 is moved to open relation.

The adjusting screw 50 is formed with a kerfed outer end 54 adapted to be engaged by a tool for adjusting the said screw longitudinally of the threaded opening in the screw cap 53 which latter is threadedly engaged in and closes the outer end of the chamber 35. When the screw 50 has been adjusted to provide the desired tension on the spring 43 a lock nut 55 is adapted to be tightened against the outer face of the screw cap 53 for locking the screw in set position.

The tension of the spring 43 normally maintains the ball valve 40 in open relation with the inner end of the sleeve 39 and the ball valve 41 in closed relation with the outer end thereof so that the pressure of the fluid in the outlet chamber 12 is established through the reduced passageway 36 about the periphery of the valve element 37, duct 48 and against the valve element 25 to augment the pressure thereagainst of the spring 30 so as to maintain the said valve element in seated relation closing the overload port. When the pressure of the outlet chamber reaches the predetermined limit established by the setting of the adjusting screw 50, the valve means 34 will be moved by the pressure against the outer end thereof to dispose the ball valve 40 in closed relation with the sleeve 39 and to force the ball valve 41 from its seat to thereby open the outer end of the sleeve 39 whereby the liquid from the annular space between the flange 26 and the inner end of the adapter 22 will be relieved through the duct 48 and through the sleeve 39 for discharge of the fluid through a drain 56. The reduction in the pressure against the outer face of the flange 26 changes the pressure differential on the opposite ends of the valve 25 whereby the valve is moved to open relation to discharge the overload of the fluid through the discharge port.

The predetermined pressure limit of the fluid in the outlet chamber 12 determined by the setting of the tension on the spring 43 provides the pressure at which the valve element 25 "cuts out" to effect the overload discharge of the fluid, while the predetermined lower pressure limit of the fluid in the outlet chamber 12 provides the pressure at which the valve element "cuts in" to discontinue the overload discharge. The difference in pressure between the "cutting in" and "cutting out" of the valve element 25, or differential, is obtained by the relative areas of the opposite ends of the bore 38 in the sleeve 39 which bore is of slightly tapered formation being larger at the inner end which is closed by the ball valve element 40.

The duct 48 is provided with a fluid restrictor 58 which is adjustable to restrict the flow of the fluid in either direction or in both directions in order to prevent pressure surges in the system. As illustrated, the restrictor 58 is arranged to restrict the flow of the fluid through the duct 48 in a direction to slow up the opening movement of the valve element 25 to thereby prevent the build up of pressure surges in the return line to the reservoir and which will allow the full flow of the pressure in the duct 48 with the movement of the valve element 25 to closed relation. The restrictor 58 is arranged in a bore 60 which intersects the duct 48 in the valve body 10 and opens through one side thereof. The bore 60 is closed by a plug 61 having an exteriorly threaded skirt 62 which threadedly engages the bore and is provided with a filter 63 in the outer end of the passageway 64 therein. The passageway 64 has one or more outlets 65 which communicate with the portion of the duct 48 leading to the peripheral space surrounding the skirt 23 of the adapter 22. The plug 61 is in bearing engagement against the outer end of a tubular member 66 which snugly fits the peripheral wall of the inner end of the bore 60 and is provided with a projection 67 to retain the inner end thereof in spaced relation from the inner end 68 of the bore. The tubular member 66 is provided with a vertical slot 69 in the outer periphery thereof which communicates with the portion of the duct 48 opening into the annular recess 44 in the periphery of the sleeve 39.

The tubular member 66 is formed with a thickened wall portion at its lower end providing a restricted passageway 70 and an annular shoulder 71. A plunger 73 is slidably mounted in the tubular member 66 and is disposed in inwardly tensioned engagement by means of a coiled spring 74 interposed between the outer end thereof and the filter 63. A threaded screw 75 is adjustably secured in the threaded inner periphery of the plunger 73 and is provided with a conical shaped lower end portion 76. The screw 75 is adapted to be set to provide the desired clearance between the end portion 76 thereof and the periphery of the restricted passageway 70 by adjusting the threaded upper end of the screw 75 in the threaded inner periphery of the plunger 73. The plunger 73 is moved upwardly against the tension of the spring 74 by the pressure of the fluid against the lower end thereof and against the end portion 76 of the screw 75 so as to permit of the free flow of the fluid upwardly through the restrictor 58 or in the direction of the flow from the outlet 12 to the space surrounding the skirt 23 of the adapter 22, while restricting the flow of the fluid from the space surrounding said skirt and downwardly about the plunger 73 and about the conical end portion 76 of the screw 75 in the passageway 70. Thus when the pressure in the outlet chamber 12 exceeds the predetermined limit, the valve element 37 will be moved by the pressure to seat the ball valve element 40 on the inner end of the sleeve 39 and to move the ball valve element 41 from seated engagement with the sleeve 39 whereby the pressure at the rear of the valve element 25 is reduced to permit the said valve to open. The restrictor 58 retards the flow of the fluid from the chamber surrounding the skirt 23 as hereinbefore described so as to retard the opening movement of the valve 25, thereby preventing surges in the pressure in the pipe-line from the discharge outlet 21 to the reservoir.

The adapter may also be arranged to prevent pressure surges in the system connected with the discharge chamber 12 by restricting the flow of the fluid through the duct 48 with the opening movement of the valve element 15. As illustrated in Figs. 3 and 4 of the drawings, the restrictor is so arranged. In this form of the invention the unloader valve includes a valve body 80 which is provided with an inlet chamber 81 and an outlet chamber 82 having a valve port 83 therebetween which is controlled by a reciprocatory valve element 84 similar to the construction and arrangement in the previous form of the invention. The valve body 80 is also provided with a bore or chamber 85 which is in communication with the inlet chamber 81 and which provides an overload discharge outlet 86. The said discharge outlet is controlled by a reciprocatory valve element 87 disposed in tensioned engagement with an adapter 88 by means of a coiled spring 89 to close said outlet. The pressure in the outlet chamber 82 is adapted to be admitted to the annular space 90 surrounding the valve element 87 and against the flanged inner end 91 thereof so as to move the valve element to open relation when the pressure in the outlet chamber 82 exceeds a predetermined limit. For this purpose the valve body is provided with a duct 92 extending from said chamber 85 to an annular chamber 93 which opens through the side of the valve body at its outer end and at its inner end opens into the outlet chamber 82 through a restricted passageway 94. A valve means 95 is arranged at the inner end of the chamber 93 and includes a ball valve element 96 arranged between valve seats 97 and 98 for opening and closing the passageway for the flow of the fluid from the outlet chamber 82 to said annular space 90 and for opening and closing the passageway for the flow of fluid from said annular space 90 to a drain 99. The ball valve element 96 is normally tensioned by means of a coiled spring 100 interposed between an adjustable screw 101 and a member 102 having a stem 103 protruding freely through the valve seat 98 and engaging the valve element 96 to retain the same on the valve seat 97 until the pressure in the outlet chamber 82 exceeds the pressure set on the spring 100.

In this form of the invention a restrictor 105 similar to the restrictor 58 in the previous form of the invention is interposed in the duct 92. The restrictor 105 similarly includes a screw 106 having a tapered lower end 107 and which is adjustably secured in a plunger 108 mounted for reciprocatory movement in a tubular member 109 secured in a bore 110 in the valve body by a screw cap 111. A coiled spring 112 tensions the plunger 108 so as to restrict the flow of the fluid downwardly about the plunger, while the pressure of the fluid flowing in the opposite direction raises the plunger to permit the free flow of the fluid. This arrangement retards the flow of the fluid from the annular space 90 through the duct 92 to thereby prevent surges in the portion of the system connected with the outlet chamber 82.

In place of the restrictor 58 in the valve shown in Fig. 1, or in place of the restrictor 105 in the valve shown in section in Fig. 3 of the drawings, the flow of the fluid in either or both directions through the said valves may be restricted by means of the restrictor 120 shown in Fig. 5 of the drawings. As illustrated, the restrictor 120 is adapted to be arranged in the recess 110 in the valve body 80 so as to intersect the duct 92. The restrictor includes a plunger 122 having oppositely disposed screws 123 and 124 projecting through the opposite ends thereof and which are formed with tapered outer ends adapted to protrude into openings 125 and 126 respectively in a disk 127 and the lower end of a tubular member 128 snugly fitting the bore 110. The disk 127 is retained in position on the tubular member 128 by means of a screw plug 129 threadedly secured in the upper end of the bore 110. The plunger 122 has reciprocatory movement between the disk 127 and the restricted lower end of the tubular member 128 and the screws 123 and 124 are adjustable in the threaded openings in the plunger for varying the clearance between the tapered ends thereof and the peripheries of the openings 125 and 126 respectively. This clearance provides a restriction for the flow of the fluid through the duct 92. The plunger 122 freely fits within the tubular member 128 to permit of the flow of the fluid about the periphery of the plunger and the ends of the plunger are slotted as at 130 and 131 to permit of the flow of the fluid between the ends of the plunger and the disk 127 and the bottom of the tubular member 128.

The screws 123 and 124 may be adjusted in the plunger 122 to restrict the closing movement of the valve 87 and to restrict the opening movement of the valve 84 to thereby prevent pressure surges in the return line threadedly secured in the threaded opening 86 and in the service line threadedly secured in the threaded opening 82.

It is to be understood that the plungers freely fit the tubular members while the end of the plunger 73 is provided with a projection 77 which spaces the same from the annular shoulder 71 to permit of the flow of the liquid about the end of said plunger, while the tubular member 109 is provided with a slot 114 and the plunger 108 is provided with a projection 115 at the end thereof to permit of the flow of the liquid across the end of said plunger when the tapered end 107 is in close relation with the reduced lower end of the tubular member 109.

What is claimed is:

1. In an unloader hydraulic valve, a valve body having inlet and outlet chambers in communication with each other through a valve port and an auxiliary chamber in communication with said inlet chamber providing an overload discharge port, a valve element for controlling the flow of liquid through the port between said inlet and outlet chambers, an overload valve element arranged in said auxiliary chamber for controlling the flow of liquid from the inlet chamber through said overload discharge port, said valve body having a passageway communicating with said outlet chamber providing inlet and outlet ports of relatively different sizes and having a duct extending between said auxiliary chamber and said passageway intermediate said inlet and outlet ports, means biasing said valve elements respectively toward closed relation, tensioned valve means arranged in said passageway for movement thereof at predetermined pressures of the liquid in the outlet chamber to control said inlet and outlet ports to thereby permit of the flow of liquid to and from said auxiliary chamber through said duct to increase the pressure against the overload valve element opposed by the inlet pressure when the liquid flows through said duct in one direction and to reduce the pressure against the overload valve element opposed by the inlet pressure when the liquid flows through said duct in the opposite direction, and a restrictor valve interposed in said duct and having a valve element movable in one direction to fully open relation by the pressure of the liquid to permit of the unrestricted flow of the liquid in one direction through said restrictor valve and said restrictor valve element being movable in the opposite direction into close relation with a passageway for restricting the flow of the liquid in the opposite direction through said restrictor valve to thereby slow up the movement of one of said first mentioned valve elements for preventing surges in the liquid flowing into the system from said valve.

2. In an unloader hydraulic valve, a valve body having inlet and outlet chambers in communication with each other through a valve port and an auxiliary chamber in communication with said inlet chamber providing an overload discharge port, a valve element for controlling the flow of liquid through the port between said inlet and outlet chambers, an overload valve element arranged in said auxiliary chamber for controlling the flow of liquid from the inlet chamber through said overload discharge port, said valve body having a passageway communicating with said outlet chamber providing inlet and outlet ports of relatively different sizes and having a duct extending between said auxiliary chamber and said passageway intermediate said inlet and outlet ports, means biasing said valve elements respectively toward closed relation, tensioned valve means arranged in said passageway for movement thereof at a predetermined pressure of the liquid in the outlet chamber to control said inlet and outlet ports to thereby permit of the flow of the liquid in one direction through said duct to increase the pressure against the overload valve element which is opposed by the inlet pressure, and said tensioned valve means being movable at a predetermined different pressure of the liquid in the outlet chamber to control said inlet and outlet ports to thereby permit of the flow of the liquid in the opposite direction through said duct to reduce the pressure against the overload valve element which is opposed by the inlet pressure, and a valve element freely fitting a passageway intersecting said duct and movable in one direction to fully open relation by the pressure of the liquid thereagainst to permit of the unrestricted flow of the liquid through said passageway in said one direction and being movable in the opposite direction by the pressure of the liquid thereagainst into close relation with said passageway for restricting the flow of the liquid through said intersecting passageway in said opposite direction to thereby slow up the movement of one of said first mentioned valve elements for preventing surges in the liquid flowing into the system from said valve.

3. In an unloader hydraulic valve, a valve body having inlet and outlet chambers in communication with each other through a valve port and an auxiliary chamber in communication with said inlet chamber providing an overload discharge port, a valve element for controlling the flow of liquid through the port between said inlet and outlet chambers, an overload valve element arranged in said auxiliary chamber for controlling the flow of liquid from the inlet chamber through said overload discharge port, said valve body having a passageway communicating with said outlet chamber providing inlet and outlet ports of relatively different sizes and having a duct extending between said auxiliary chamber and said passageway intermediate said inlet and outlet ports, means biasing said valve elements toward closed relation against the pressure of the inlet liquid, tensioned valve means arranged in said passageway for movement thereof at a predetermined pressure of the liquid in the outlet chamber to control said inlet and outlet ports to thereby permit of the flow of the liquid from said outlet chamber through said duct to augment the biasing pressure on said overload valve element and said tensioned valve means being movable at a predetermined different pressure of the liquid in the outlet chamber to control said inlet and outlet ports to thereby permit of the flow of liquid from said auxiliary chamber through said duct for discharge through said outlet port to thereby reduce the pressure tending to move said overload valve element toward closed relation, and a valve element freely fitting a passageway intersecting said duct and movable in one direction to fully open relation by the pressure of the liquid thereagainst to permit of the unrestricted flow of the liquid through said passageway in said one direction and said valve element having a reduced end and being movable in the opposite direction by the pressure of the liquid thereagainst into close relation of said reduced end with a restricted portion of said passageway for restricting the flow of the liquid through said passageway in said opposite direction to thereby slow up the movement of one of said first mentioned valve elements for preventing surges in the liquid flowing into the system from said valve.

4. In an unloader hydraulic valve, a valve body having inlet and outlet chambers in communication with each other through a valve port and an auxiliary chamber in communication with said inlet chamber providing an overload discharge port, a valve element for controlling the flow of liquid through the port between said inlet and outlet chambers, an overload valve element arranged in said auxiliary chamber for controlling the flow of liquid from the inlet chamber through said overload discharge port, said valve body having a passageway communicating with said outlet chamber providing inlet and outlet ports of relatively different sizes and having a duct extending between said auxiliary chamber and said passageway intermediate said inlet and outlet ports, means biasing said valve elements toward closed relation against the pressure of the inlet liquid, tensioned valve means arranged in said passageway for movement thereof at a predetermined pressure of the liquid in the outlet chamber to control said inlet and outlet ports to thereby permit of the flow of the liquid from said outlet chamber through said duct to augment the biasing pressure on said overload valve element and said tensioned valve means being movable at a predetermined different pressure of the liquid in the outlet chamber to control said inlet and outlet ports to thereby permit of the flow of liquid from said auxiliary chamber through said duct for discharge through said outlet port to thereby reduce the pressure tending to move said overload valve element toward closed relation, and a valve element freely fitting a passageway intersecting said duct and movable in one direction to fully open relation by the pressure of the liquid thereagainst to permit of the unrestricted flow of the liquid through said passageway in said one direction and said valve element having a tapered end and being movable in the opposite direction by the pressure of the liquid thereagainst into close relation of said tapered end with a restricted portion of said passageway for restricting the flow of the liquid through said passageway in said opposite direction to thereby slow up the movement of one of said first mentioned valve elements for preventing surges in the liquid flowing into the system from said valve, and said tapered end being adjustable to vary the space between the same and said restricted portion of the passageway for varying the flow through said passageway in said opposite direction.

5. In an unloader hydraulic valve, a valve body having inlet and outlet chambers in communication with each other through a valve port and an auxiliary chamber in communication with said inlet chamber providing an overload discharge port, a valve element for controlling the flow of liquid through the port between said inlet and outlet chambers, an overload valve element arranged in said auxiliary chamber for controlling the flow of liquid from the inlet chamber through said overload discharge port, said valve body having a passageway communicating with said outlet chamber providing inlet and outlet ports of relatively different sizes and having a duct extending between said auxiliary chamber and said passageway intermediate said inlet and outlet ports, means biasing said valve elements toward closed relation against the pressure of the inlet liquid, tensioned valve means arranged in said passageway for movement thereof at a predetermined pressure of the liquid in the outlet chamber to control said inlet and outlet ports to thereby permit of the flow of the liquid from said outlet chamber through said duct to augment the biasing pressure on said overload valve element and said tensioned valve means being movable at a predetermined different pressure of the liquid in the outlet chamber to control said inlet and outlet ports to thereby permit of the flow of liquid from said auxiliary chamber through said duct for discharge through said outlet port to thereby reduce the pressure tending to move said overload valve element toward closed relation, and a valve element freely fitting a passageway intersecting said duct and having tapered opposite ends adapted to be disposed in close relation with restricted portions of said passageway respectively for restricting the flow of the liquid through said passageway and duct to thereby slow up the movement of said first mentioned valve elements for preventing surges in the liquid flowing into the system from said overload discharge port and outlet chamber, and said tapered ends being adjustable for varying the distance between the same and said restricted portions of the passageway for restricting the flow in either direction.

References Cited in the file of this patent

UNITED STATES PATENTS

| Number | Name | Date |
|---|---|---|
| 2,410,751 | Schultz | Nov. 5, 1946 |
| 2,474,772 | Ashton | June 28, 1949 |
| 2,545,712 | Stevenson | Mar. 20, 1951 |
| 2,571,154 | Mercier | Oct. 16, 1951 |
| 2,579,051 | Rose | Dec. 18, 1951 |